US012472533B2

(12) United States Patent
Wu

(10) Patent No.: US 12,472,533 B2
(45) Date of Patent: Nov. 18, 2025

(54) IMPURITY RECOVERY DEVICE AND IMPURITY RECOVERY METHOD

(71) Applicant: Kioxia Corporation, Tokyo (JP)

(72) Inventor: Jiahong Wu, Yokkaichi (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/465,490

(22) Filed: Sep. 12, 2023

(65) Prior Publication Data

US 2024/0307929 A1 Sep. 19, 2024

(30) Foreign Application Priority Data

Mar. 13, 2023 (JP) ................................. 2023-039045

(51) Int. Cl.

| | |
|---|---|
| ***B08B 3/14*** | (2006.01) |
| ***B08B 1/00*** | (2024.01) |
| ***B08B 1/04*** | (2006.01) |
| ***B08B 1/32*** | (2024.01) |
| ***B08B 1/50*** | (2024.01) |
| ***B08B 3/02*** | (2006.01) |

(52) U.S. Cl.

CPC .................. *B08B 3/14* (2013.01); *B08B 1/32* (2024.01); *B08B 1/50* (2024.01); *B08B 3/02* (2013.01)

(58) Field of Classification Search

CPC .... B08B 3/02; B08B 1/50; B08B 1/32; B08B 3/14

See application file for complete search history.

(56) References Cited

U.S. PATENT DOCUMENTS 7,686,891 B2 3/2010 Wakuda et al.

FOREIGN PATENT DOCUMENTS

| | | | | | |
|---|---|---|---|---|---|
| JP | 11204604 A | * | 7/1999 | | |
| JP | 2002039928 A | * | 2/2002 | | |
| JP | 2003152038 A | * | 5/2003 | | |
| JP | 2006-013234 A | | 1/2006 | | |
| JP | 2008-159657 A | | 7/2008 | | |
| JP | 2008-300605 A | | 12/2008 | | |
| JP | 2009-253174 A | | 10/2009 | | |
| JP | 2014-122842 A | | 7/2014 | | |
| TW | 200922701 A | * | 6/2009 | ....... | H01L 21/67028 |
| WO | WO-2005015627 A1 | * | 2/2005 | ............... | B08B 1/04 |

OTHER PUBLICATIONS https://www.full-chem.co.jp/industrial/washing/?utm_source=yahoo&utm_medium=cpc&utm_campaign=02_s_01_sozai (with English Translation) (4 pages).

* cited by examiner

*Primary Examiner* — Benjamin L Osterhout

(74) *Attorney, Agent, or Firm* — Oblon, McClelland, Maier & Neustadt, L.L.P.

(57) ABSTRACT

An impurity recovery device according to the present embodiment may recover impurities present on a surface of a substrate. The substrate may be placed on a stage. A sprayer may spray a recovery liquid toward the substrate along a direction from a side of a central part of the substrate to a side of the end part of the substrate. A recovery portion may recover the recovery liquid from the end part of the substrate.

9 Claims, 12 Drawing Sheets

IMPURITY RECOVERY DEVICE AND IMPURITY RECOVERY METHOD

CROSS REFERENCE TO RELATED APPLICATIONS

This application is based upon and claims the benefit of priority from the prior Japanese Patent Application No. 2023-039045, filed on Mar. 13, 2023, the entire contents of which are incorporated herein by reference.

FIELD

The embodiments of the present invention relate to an impurity recovery device and an impurity recovery method.

BACKGROUND

In quantitative analysis of impurities, such as ICP-MS (Inductively Coupled Plasma Mass Spectrometry), impurities present on a surface of a semiconductor substrate are recovered by being dissolved in a recovery liquid, and this recovery liquid is subjected to analysis. The impurities are thereby analyzed.

In a case of a water-repellent semiconductor substrate, recovery of impurities by the recovery liquid can be performed automatically. However, in a case of a hydrophilic semiconductor substrate, the recovery liquid has to be manually wiped, and it is therefore difficult to automate recovery of impurities by the recovery liquid.

DETAILED DESCRIPTION

Figure 1:
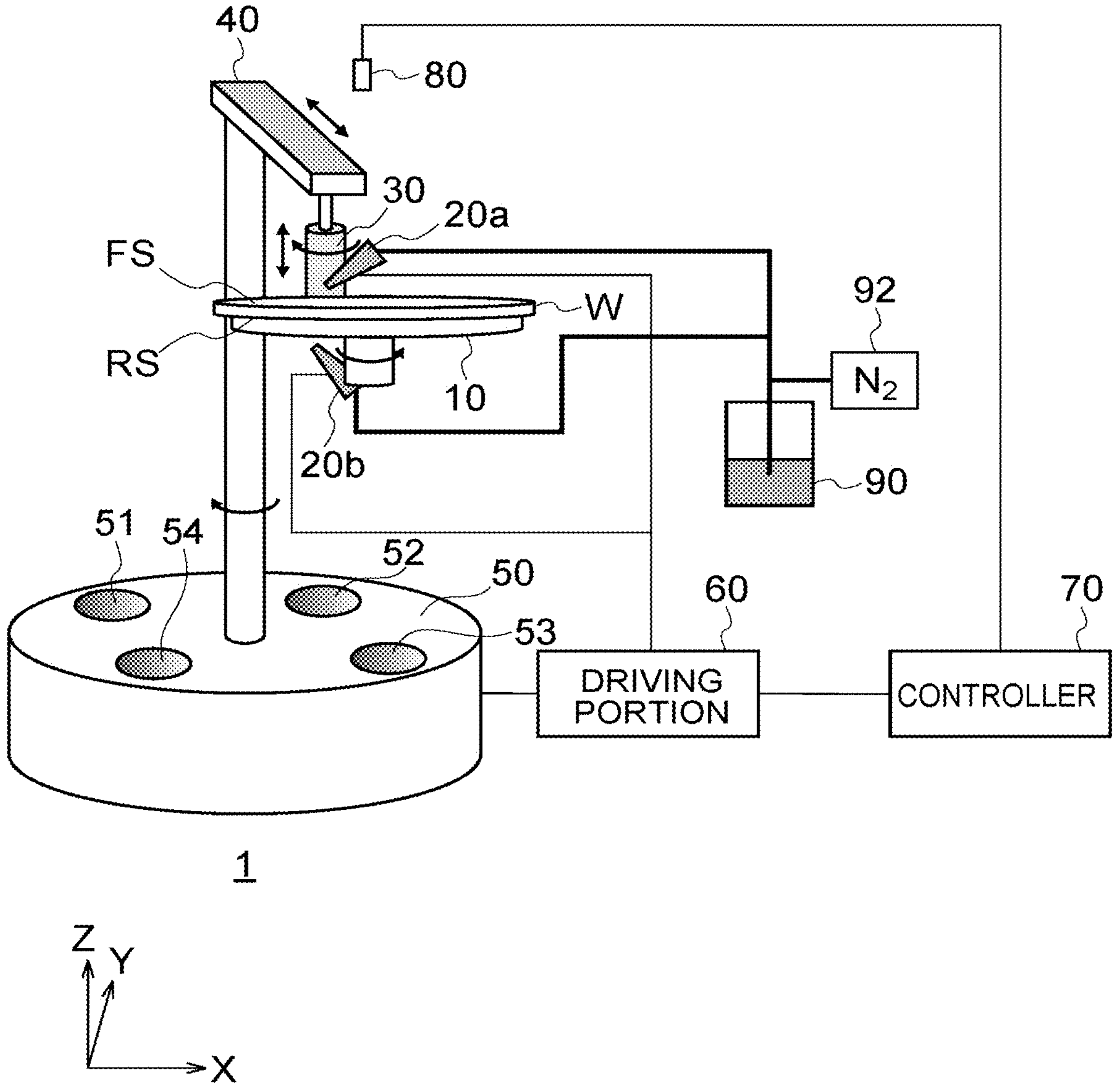
FIG. 1 is schematic diagram illustrating a configuration example of an impurity recovery device according to a first embodiment.

Embodiments will now be explained with reference to the accompanying drawings. The present invention is not limited to the embodiments. In the present specification and the drawings, elements identical to those described in the foregoing drawings are denoted by like reference characters and detailed explanations thereof are omitted as appropriate.

An impurity recovery device according to the present embodiment may recover impurities present on a surface of a substrate. The substrate may be placed on a stage. A sprayer may spray a recovery liquid toward the substrate along a direction from a side of a central part of the substrate to a side of the end part of the substrate. A recovery portion may be configured to recover the recovery liquid from the end part of the substrate.

First Embodiment

FIG. 1 is schematic diagram illustrating a configuration example of an impurity recovery device 1 according to a first embodiment. The impurity recovery device 1 is used for recovering impurities present on a surface of a semiconductor substrate W before quantitative analysis of the impurities by, for example, ICP-MS. The impurities are dissolved in a recovery liquid and are recovered together with the recovery liquid. A quantitative analysis device such as an ICP-MS device performs quantitative analysis of the impurities by analyzing this recovery liquid. The impurity recovery device 1 may be incorporated in the quantitative analysis device such as an ICP-MS device or provided as a device separate from the quantitative analysis device.

The impurity recovery device 1 includes a stage 10, sprayers 20_a_ and 20_b_, a recovery portion 30, a support portion 40, an extraction and cleaning portion 50, a driving portion 60, a controller 70, and a camera 80.

The stage 10 allows the semiconductor substrate W to be placed thereon and is rotatable about the center of the semiconductor substrate W within the X-Y plane.

The sprayers 20_a_ and 20_b_ make the recovery liquid in a liquid state into a mist and spray the mist. For example, the sprayers 20_a_ and 20_b_ may be configured as nebulizers. The sprayers 20_a_ and 20_b_ spray the recovery liquid together with dry gas (for example, nitrogen ($N_2$)) from the central part of the semiconductor substrate W toward the end part (the bevel part) of the semiconductor substrate W. That is, the sprayers 20_a_ and 20_b_ spray the recovery liquid toward the semiconductor substrate W along a direction from a side of a central part of the semiconductor substrate W to a side of the end part of the semiconductor substrate W. The sprayers 20_a_ and 20_b_ mix the recovery liquid and the dry gas together and spray them to the end part of the semiconductor substrate W. The supply amount of recovery liquid is sufficiently smaller than the supply amount of dry gas.

The sprayer 20*a* is arranged above the semiconductor substrate W and sprays the recovery liquid and the dry gas from a front surface FS (a surface opposite to a rear surface RS that is in contact with the stage 10) side of the semiconductor substrate W to the end part. The sprayer 20*b* is arranged below the semiconductor substrate W and sprays the recovery liquid and the dry gas from the rear surface RS (the surface that is in contact with the stage 10) side of the semiconductor substrate W to the end part. That is, the sprayers 20*a* and 20*b* spray the recovery liquid and the dry gas from both the front surface side and the rear surface side of the semiconductor substrate W toward the end part of the semiconductor substrate W. The spraying pressures of the recovery liquid and the dry gas from the respective sprayers 20*a* and 20*b* are preferably substantially equal to each other, for example. In this case, it is easy to keep the semiconductor substrate W at a horizontal state. The sprayers 20*a* and 20*b* are each arranged with the opening of its nozzle facing to outside of the end part of the semiconductor substrate W, and spray the recovery liquid and the dry gas from the end part of the semiconductor substrate W to the outside thereof. The recovery liquid is thereby caused to flow or fly from the end part of the semiconductor substrate W to the recovery portion 30 arranged outside the semiconductor substrate W.

As the recovery liquid, any of hydrochloric acid (HCl), hydrofluoric acid (HF), nitric acid ($HNO_3$), and hydrogen peroxide solution ($H_2O_2$) is suitably used, for example. The recovery liquid is accommodated in a recovery-liquid tank 90 in a liquid state and is supplied to the sprayers 20*a* and 20*b* through pipes. Further, a gas tank 92 supplies the dry gas (for example, nitrogen ($N_2$)) to the recovery liquid, and the sprayers 20*a* and 20*b* spray the recovery liquid in the mist form together with the dry gas to the end part of the semiconductor substrate W. After being sprayed onto the semiconductor substrate W, the recovery liquid is absorbed and held in the recovery portion 30.

The recovery portion 30 recovers the recovery liquid from the end part of the semiconductor substrate W. The recovery portion 30 is formed by, for example, a porous material or a fiber material. As the material for the recovery portion 30, it is preferable to use a material that does not react with the selected recovery liquid, for example. Examples of the porous material that can be used for the recovery portion 30 include a PVA (polyvinyl alcohol) sponge, a PVA mesh film, a PTFE (polytetrafluoroethylene) flexible sheet, a PVF (polyvinyl formal) or PU (polyurethane) sponge such as a sponge formed by adding a water-soluble pore-forming agent to PVA.

Further, a fiber material, such as microfiber, nanofiber, cotton, rubber fiber, and quartz wool, can be used for the recovery portion 30.

Furthermore, a spherical, rod-like, or sheet-like member made of pressed $SiO_2$ or SiN powder, or porous or fibrous rubber may be used for the recovery portion 30. The recovery portion 30 made of such a material can absorb and recover the recovery liquid from the end part of the semiconductor substrate W.

When recovering the recovery liquid, the recovery portion 30 rotates to follow rotation in the circumferential direction of the semiconductor substrate W while being in contact with the end part of the semiconductor substrate W. That is, the recovery portion 30 rotates about the axis extending in the Z-direction by being driven by the driving portion 60. For example, the recovery portion 30 rotates to follow rotation of the semiconductor substrate W so as to roll on the outer circumference of the semiconductor substrate W. The recovery portion 30 may roll so as not to slide on the outer circumference of the semiconductor substrate W or may roll while sliding on the outer circumference of the semiconductor substrate W.

The support portion 40 supports the recovery portion 30 to allow it to rotate. The support portion 40 can move the recovery portion 30 up and down (in the ±Z-direction). The support portion 40 can also move the recovery portion 30 away from the semiconductor substrate W or bring it closer to the semiconductor substrate W in the X-Y plane. Further, the support portion 40 can move and rotate the recovery portion 30 about a support provided in the extraction and cleaning portion 50 in the X-Y plane.

The extraction and cleaning portion 50 includes an extractor 51, a cleaning portion 52, a washing portion 53, and a dryer 54. The extractor 51 is a liquid tank that accommodates a solution identical to the recovery liquid, for example, and has such a size that the recovery portion 30 can be inserted thereto and be accommodated therein. The support portion 40 moves the recovery portion 30 and inserts the recovery portion 30 into the extractor 51. In the extractor 51, the recovery portion 30 is immersed in the recovery liquid, so that impurities absorbed in the recovery portion 30 are extracted. A pipe for transferring the recovery liquid to a quantitative analysis device (not illustrated) is connected to the extractor 51. Accordingly, the extracted impurities are transferred together with the recovery liquid from the extractor 51 to the quantitative analysis device via the pipe, and the impurities are subjected to quantitative analysis in the quantitative analysis device. The impurities are metal contaminants, for example, alkali metals, alkali earth metals, or transition metals.

The cleaning portion 52 is a liquid tank that accommodates a cleaning solution and has such a size that the recovery portion 30 can be inserted thereto and be accommodated therein. The support portion 40 moves the recovery portion 30 and inserts the recovery portion 30 into the cleaning portion 52. The cleaning portion 52 immerses the recovery portion 30 in the cleaning solution to clean it. Consequently, dirt adhering to the recovery portion 30 is washed away. It suffices that the cleaning solution is any of hydrochloric acid (HCl), hydrofluoric acid (HF), nitric acid ($HNO_3$), and hydrogen peroxide solution ($H_2O_2$), as with the recovery liquid, for example.

The washing portion 53 is a liquid tank that accommodates pure water and has such a size that the recovery portion 30 can be inserted thereto and be accommodated therein. The support portion 40 moves the recovery portion 30 and inserts the recovery portion 30 into the washing portion 53. The washing portion 53 immerses the recovery portion 30 in pure water to wash it with water. The recovery liquid and the cleaning solution contained in the recovery portion 30 are thereby washed away with pure water.

The dryer 54 is a tank with a size that enables the recovery portion 30 to be inserted thereto and be accommodated therein. The support portion 40 moves the recovery portion 30 and inserts the recovery portion 30 into the dryer 54. The dryer 54 blows dry gas (for example, nitrogen gas) to the recovery portion 30 to blow away the pure water adhering to the recovery portion 30. Thus, the recovery portion 30 is dried.

As described above, the support portion 40 inserts the recovery portion 30 into the extractor 51 to the dryer 54 in turn, so that the recovery portion 30 can be reused for recovering impurities. For example, the dried recovery portion 30 is returned to the position illustrated in FIG. 1 by the support portion 40 and is reused for recovering the recovery liquid sprayed to the end part of another semiconductor substrate W placed on the stage 10.

The driving portion 60 may be a motor or the like that drives the sprayers 20*a* and 20*b*, the recovery portion 30, the support portion 40, and the like. The driving portion 60 causes the support portion 40 to operate, thereby moving and inserting the recovery portion 30 into the extractor 51, the cleaning portion 52, the washing portion 53, and the dryer 54 in turn.

The controller 70 may be a computer or the like that controls the driving portion 60. The controller 70 may be constituted of a CPU (Central Processing Unit) and software, or may be constituted of a PLC (Programmable Logic Controller).

The camera 80 is arranged above the stage 10 in the Z-direction and captures an image of the semiconductor substrate W placed on the stage 10. The image captured by the camera 80 is transmitted to the controller 70. The controller 70 detects the end part of the semiconductor substrate W by using the image from the camera 80. For example, the controller 70 detects an angle of inclination of the end part of the semiconductor substrate W.

The recovery-liquid tank 90 accommodates the recovery liquid in the liquid state and supplies the recovery liquid to the sprayers 20*a* and 20*b* through pipes.

The gas tank 92 accommodates the dry gas (for example, nitrogen ($N_2$)) and supplies the dry gas to the sprayers 20*a* and 20*b* together with the recovery liquid mixed with the dry gas in the pipes.

The extractor 51 to the dryer 54, the recovery-liquid tank 90, and the gas tank 92 may be configured to be detachable from the impurity recovery device 1.

Figure 2:
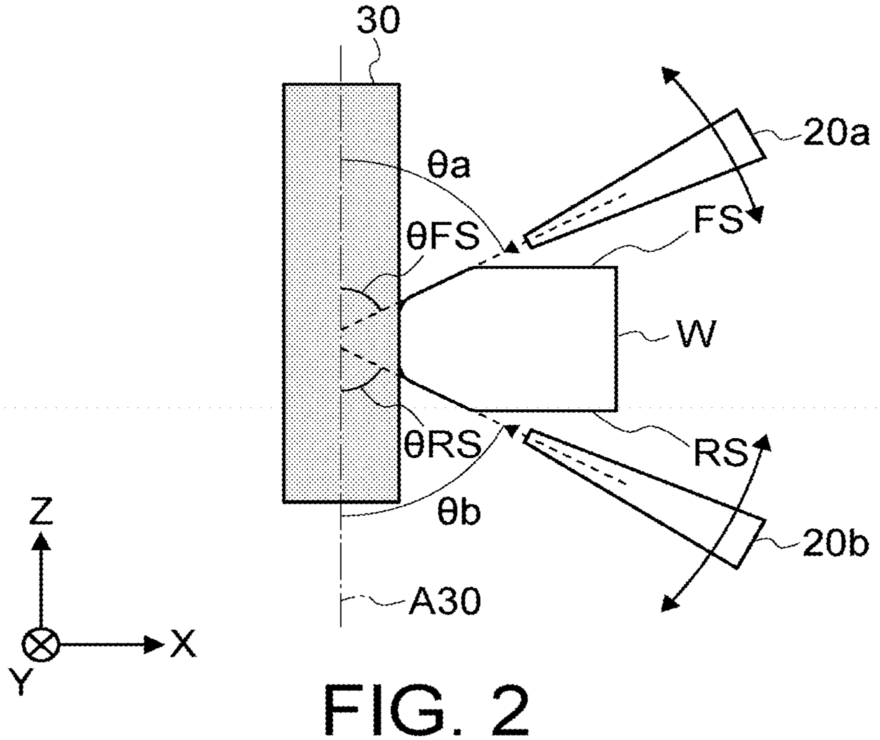
FIG. 2 is a diagram illustrating a configuration example of a recovery portion and sprayers.
Figure 3:
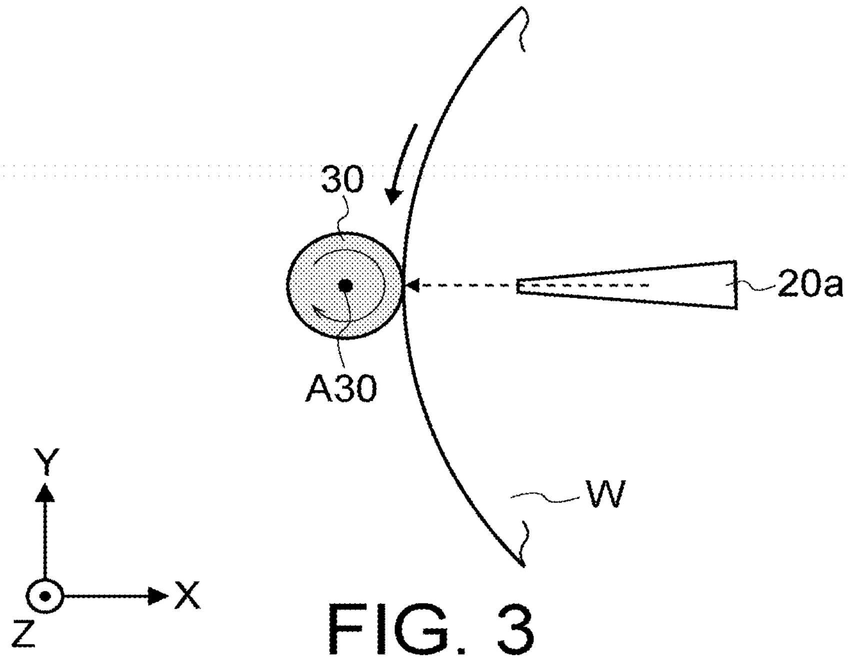
FIG. 3 is a diagram illustrating a configuration example of the recovery portion and the sprayers.

FIGS. 2 and 3 are diagrams illustrating a configuration example of the recovery portion 30 and the sprayers 20*a* and 20*b*.

The recovery portion 30 is approximately cylindrical or columnar, for example, and its side surface is in contact with the end part of the semiconductor substrate W. The recovery portion 30 comes into contact with the end part of the semiconductor substrate W from a direction approximately parallel to the surface of the semiconductor substrate W to the outer circumference of the semiconductor substrate W. As illustrated in FIG. 3, the recovery portion 30 rotates about a rotation axis A30 to follow rotation in the circumferential direction of the semiconductor substrate W while being in contact with the outer circumference of the semiconductor substrate W and rolling thereon. The recovery portion 30 rolls along the outer circumference of the semiconductor substrate W while rotating about its own axis. The recovery portion 30 is arranged with the rotation axis A30 coincident with the Z-axis, for example. The recovery portion 30 may be arranged to be inclined with respect to the semiconductor substrate W. For example, the recovery portion 30 may be arranged with the rotation axis A30 inclined from the Z-axis. The recovery portion 30 may rotate while being biased by rotation of the semiconductor substrate W. Alternatively, the recovery portion 30 may receive power from the driving portion 60 in synchronization with rotation of the semiconductor substrate W. During recovery of impurities, the support portion 40 does not need to move the rotation axis A30 of the recovery portion 30 because the stage 10 rotates the semiconductor substrate W. However, the support portion 40 may move the rotation axis A30 of the recovery portion 30 along the outer circumference of the semiconductor substrate W while making the recovery portion 30 in contact with the end part of the semiconductor substrate W.

The recovery portion 30 may be attached to the support portion 40 to be detachable therefrom. This configuration enables replacement of the recovery portion 30 only when the recovery portion 30 is deteriorated.

The sprayers 20*a* and 20*b* are arranged above and below the semiconductor substrate W in the Z-direction to sandwich the semiconductor substrate W therebetween, for example. The sprayers 20*a* and 20*b* are inclined with respect to the Z-axis so as to spray the recovery liquid and the dry gas toward the end part of the semiconductor substrate W and cause the recovery liquid to move to and be absorbed in the recovery portion 30. For example, the sprayers 20*a* and 20*b* are inclined from a state where their outlets are opposed to each other and the spraying direction is set to the Z-axis direction, toward the center of the semiconductor substrate W. Accordingly, each sprayer 20 sprays the recovery liquid and the dry gas from the central part to the end part of the semiconductor substrate W, and the sprayed recovery liquid comes into contact with the end part of the semiconductor substrate W and is then recovered into the recovery portion 30.

It is preferable that angles of inclination ea and Ob of the respective sprayers 20*a* and 20*b* with respect to the Z-axis are substantially equal to angles of inclination θFS and θRS of the end part (the bevel part) of the semiconductor substrate W with respect to the Z-axis, respectively. In this case, the outlets of the sprayers 20*a* and 20*b* spray the recovery liquid and the dry gas in a direction of inclination substantially the same as the inclination of the end part of the semiconductor substrate W. Accordingly, the recovery liquid and the dry gas can be sufficiently sprayed to the end part of the semiconductor substrate W, and the recovery liquid can be easily recovered into the recovery portion 30. During the recovery, the controller 70 may control the driving portion 60 to adjust the angles of inclination θa and θb of the sprayers 20*a* and 20*b* in accordance with the angles of inclination θFS and θRS of the end part of the semiconductor substrate W already detected by the controller 70.

Due to spraying of the recovery liquid and the dry gas by the sprayers 20*a* and 20*b* to the end part of the semiconductor substrate W, the recovery liquid is recovered into the recovery portion 30 from the end part of the semiconductor substrate W regardless of whether the semiconductor substrate W is hydrophobic or hydrophilic. The force of spraying of the recovery liquid by the sprayers 20*a* and 20*b* is adjusted in such a manner that the recovery liquid is recovered into the recovery portion 30 with the impurities on the semiconductor substrate W dissolved therein.

During the impurity recovery process, relative positions of the recovery portion 30 and the stage 10 to each other may be fixed. In this case, the recovery portion 30 is fixed in the Z-direction, and rotates with a part of its side surface in contact with the semiconductor substrate W.

Meanwhile, during the impurity recovery process, the recovery portion 30 may rotate while moving along the rotation axis A30 (in the Z-direction).

Although both the sprayers 20*a* and 20*b* may spray the recovery liquid, either one of them may blow the dry gas only without spraying the recovery liquid. In this case, impurities can be recovered and analyzed alternately for each surface of the substrate W, for example. Also in this case, it is preferable that the blowing pressure of the dry gas from one of the sprayers 20*a* and 20*b* is substantially equal to the blowing pressure of the recovery liquid and the dry gas from the other sprayer. Accordingly, it is possible to easily keep the semiconductor substrate W at a horizontal state, and the recovery liquid can flow or fly from the end part of the semiconductor substrate W toward the recovery portion 30.

As illustrated in FIG. 3, the sprayers 20*a* and 20*b* blow the recovery liquid and the dry gas to the portion where the recovery portion 30 and the semiconductor substrate W are in contact with each other. In this case, the recovery liquid and the dry gas sprayed in this manner fly toward the recovery portion 30, and it is therefore possible to prevent the recovery liquid and the dry gas from flying to the portion other than the recovery portion 30 and contaminating the inside of the impurity recovery device 1.

Figure 4A:
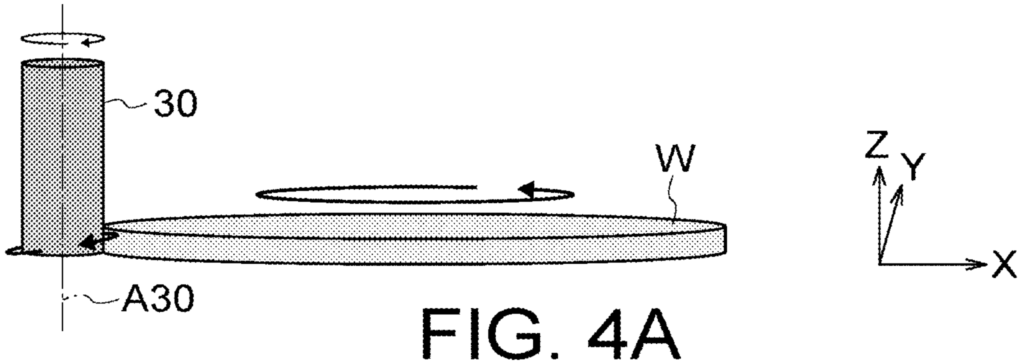
FIG. 4A is a schematic diagram illustrating an operation example of the recovery portion during an impurity recovery process.
Figure 4B:
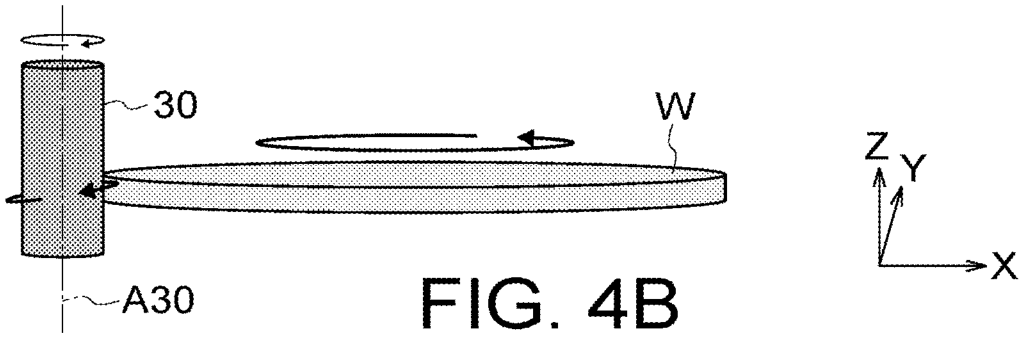
FIG. 4B is a schematic diagram illustrating an operation example of the recovery portion during the impurity recovery process.
Figure 4C:
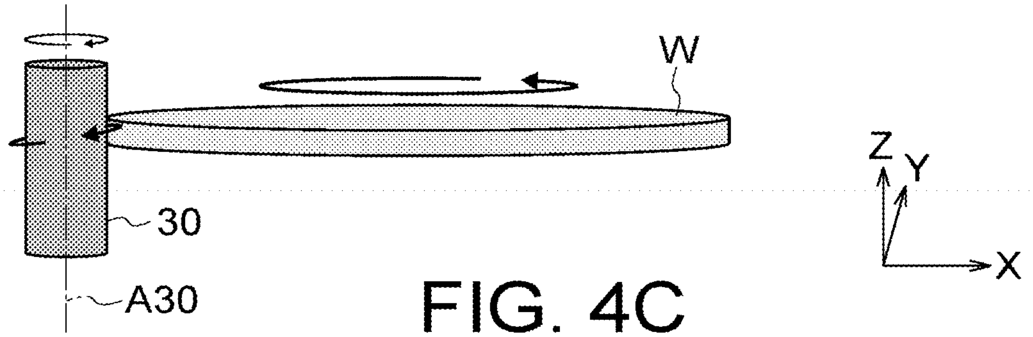
FIG. 4C is a schematic diagram illustrating an operation example of the recovery portion during the impurity recovery process.
Figure 4D:
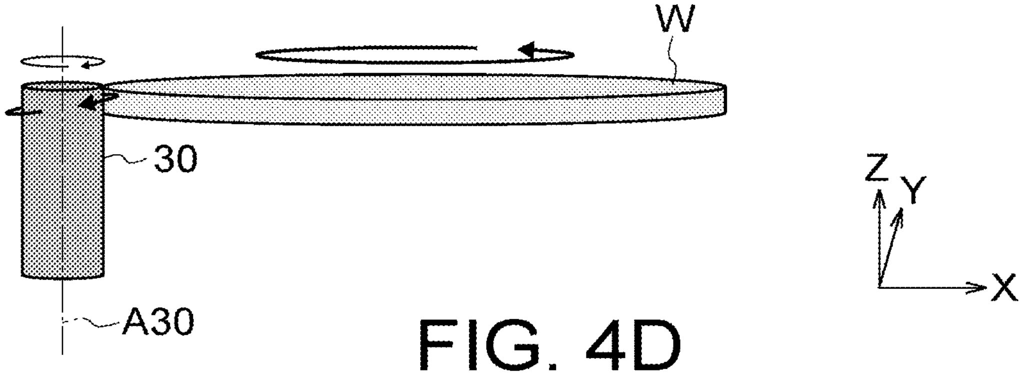
FIG. 4D is a schematic diagram illustrating an operation example of the recovery portion during the impurity recovery process.

FIGS. 4A to 4D are schematic diagrams illustrating an operation example of the recovery portion 30 during an impurity recovery process. As illustrated in FIG. 4A, during the impurity recovery process, the recovery portion 30 moves in the extending direction of the rotation axis A30 (in the Z-direction) while rolling on the outer circumference of the semiconductor substrate W. Accordingly, a portion of the recovery portion 30, which is in contact with the semiconductor substrate W, changes spirally in the side surface of the recovery portion 30. For example, the portion of contact between the semiconductor substrate W and the recovery portion 30 starts from a lower end of the side surface of the recovery portion 30 as illustrated in FIG. 4A and changes spirally to an upper end of the side surface of the recovery portion 30 as illustrated in FIGS. 4B to 4D. Thereafter, the portion of contact between the semiconductor substrate W and the recovery portion 30 may move backwards and forwards from the upper end to the lower end of the side surface of the recovery portion 30.

The moving speed of the recovery portion 30 in the Z-direction is adjusted in such a manner that the end part of the semiconductor substrate W comes into contact with the side surface of the recovery portion 30 evenly. For example, it is assumed that the width of contact between the semiconductor substrate W and the side surface of the recovery portion 30 in the Z-direction is T, the radius of the semiconductor substrate W is R, and the radius of rotation of the recovery portion 30 is r. It is further assumed that the recovery portion 30 rolls on the outer circumference of the semiconductor substrate W without sliding thereon. In this case, when the semiconductor substrate W makes one rotation, the recovery portion 30 makes n (n=R/r) rotations. Every time the recovery portion 30 makes one rotation, it moves in the Z-direction by the contact width T. With this process, the portion of contact between the semiconductor substrate W and the recovery portion 30 moves in the Z-direction spirally without overlapping on the recovery portion 30. As a result, impurities and a recovery liquid can be absorbed not by only a part of the side surface of the recovery portion 30 but by the entire side surface of the recovery portion 30.

It is preferable that the length of the recovery portion 30 in the Z-direction is n×T or more. This setting enables the portion of contact between the semiconductor substrate W and the recovery portion 30 to move spirally without overlapping on the recovery portion 30 even when the semiconductor substrate W makes one rotation.

Figure 4E:
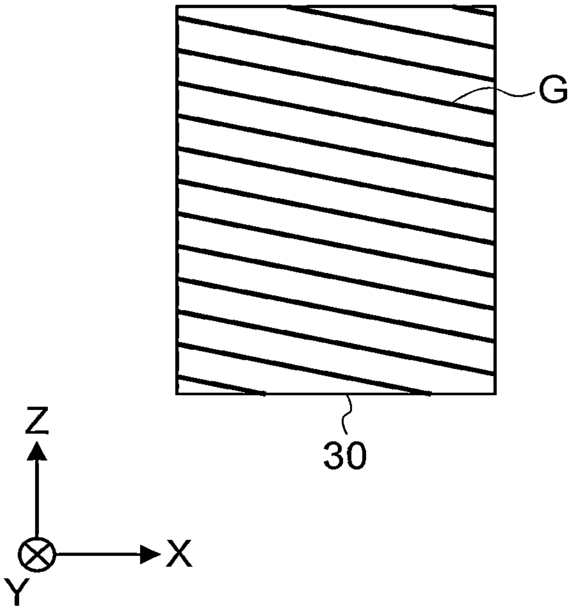
FIG. 4E is a side view illustrating a configuration example of the recovery portion.

Every time the recovery portion 30 makes one rotation, it may move in the Z-direction by a distance larger than the contact width T. Alternatively, if it is assumed that the portion of contact between the semiconductor substrate W and the recovery portion 30 may overlap on the side surface of the recovery portion 30, the recovery portion 30 may move in the Z-direction by a distance smaller than the contact width T every time it makes one rotation. Further, as illustrated in FIG. 4E, the recovery portion 30 may have a spiral groove G that fits the contact width T with the semiconductor substrate W in its side surface. FIG. 4E is a side view illustrating a configuration example of the recovery portion 30. Since the end part of the semiconductor substrate W moves relatively along the groove G in the recovery portion 30, the portion of contact between the semiconductor substrate W and the recovery portion 30 moves spirally to follow rotation of the semiconductor substrate W.

Next, an impurity recovery method using the impurity recovery device 1 is described.

Figure 5:
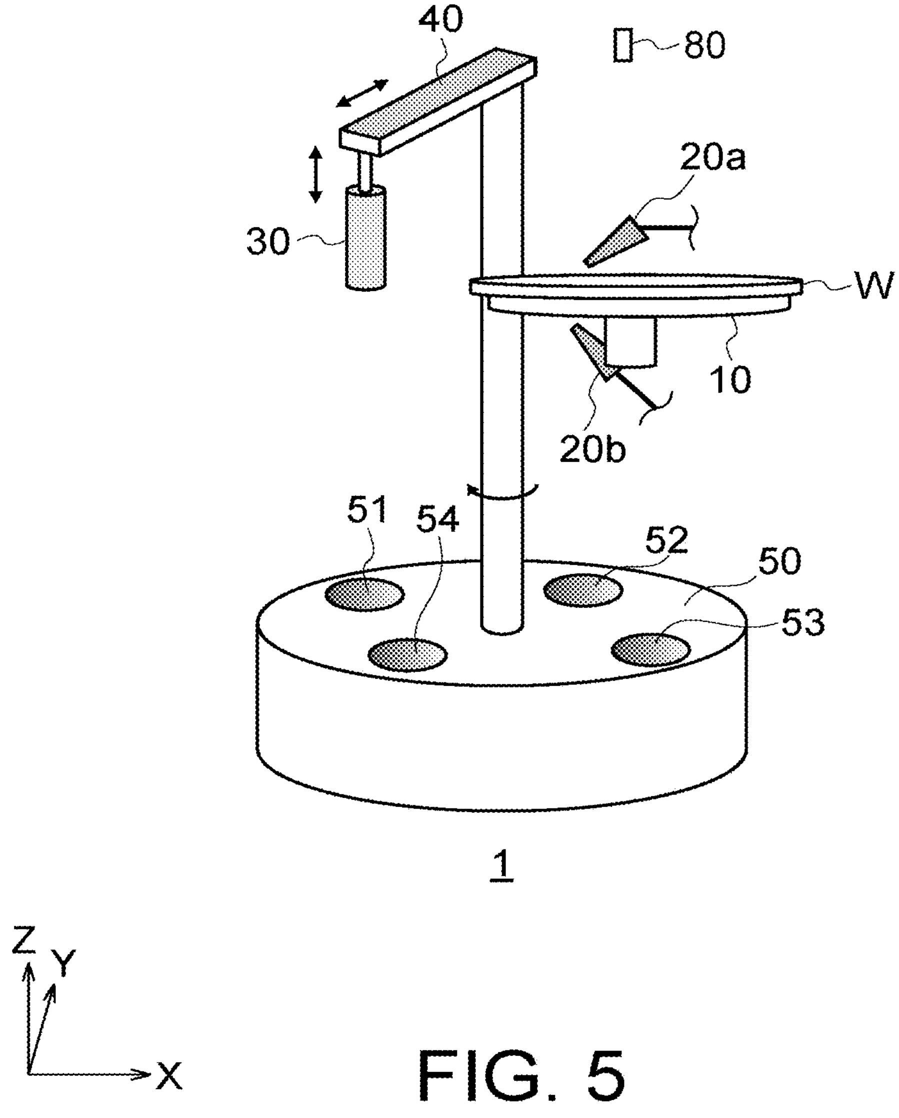
FIG. 5 is a schematic diagram illustrating an example of an impurity recovery method using the impurity recovery device according to the first embodiment.
Figure 6:
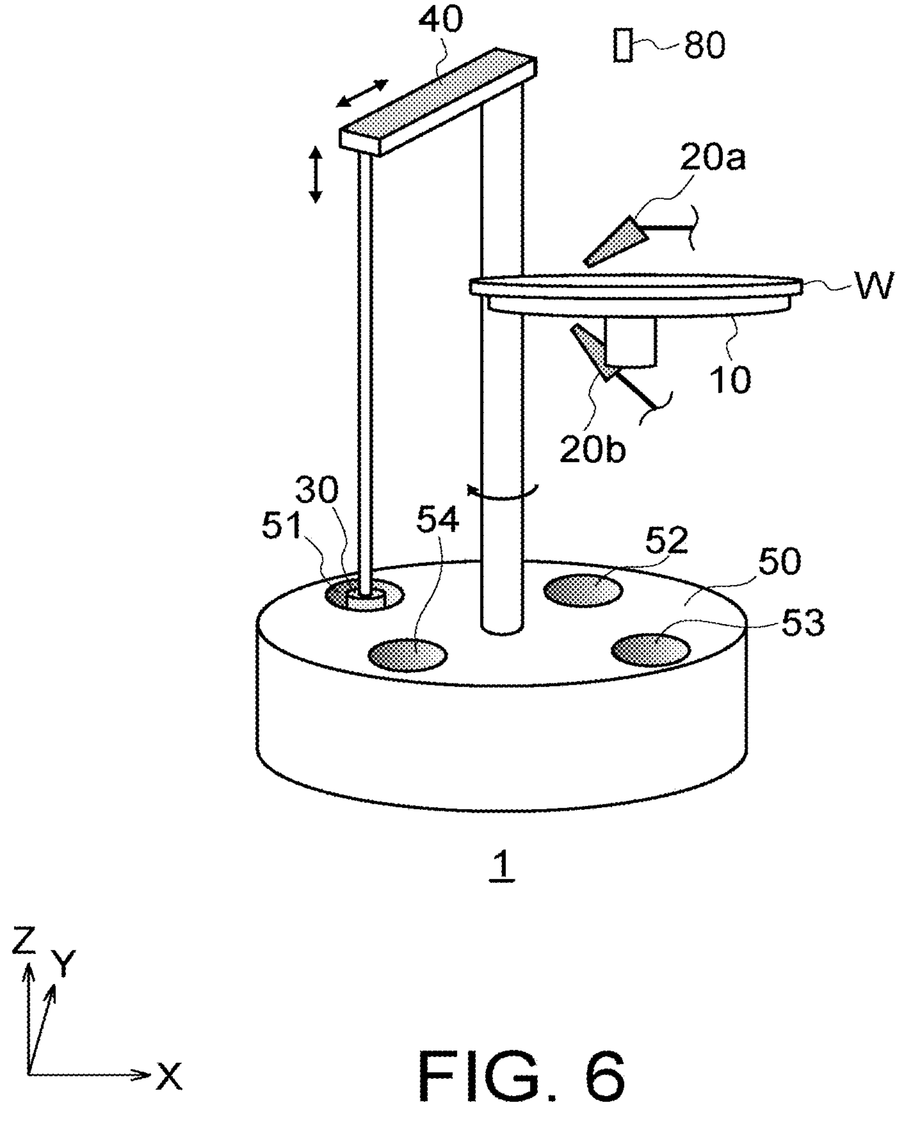
FIG. 6 is a schematic diagram illustrating an example of the impurity recovery method using the impurity recovery device according to the first embodiment.
Figure 7A:
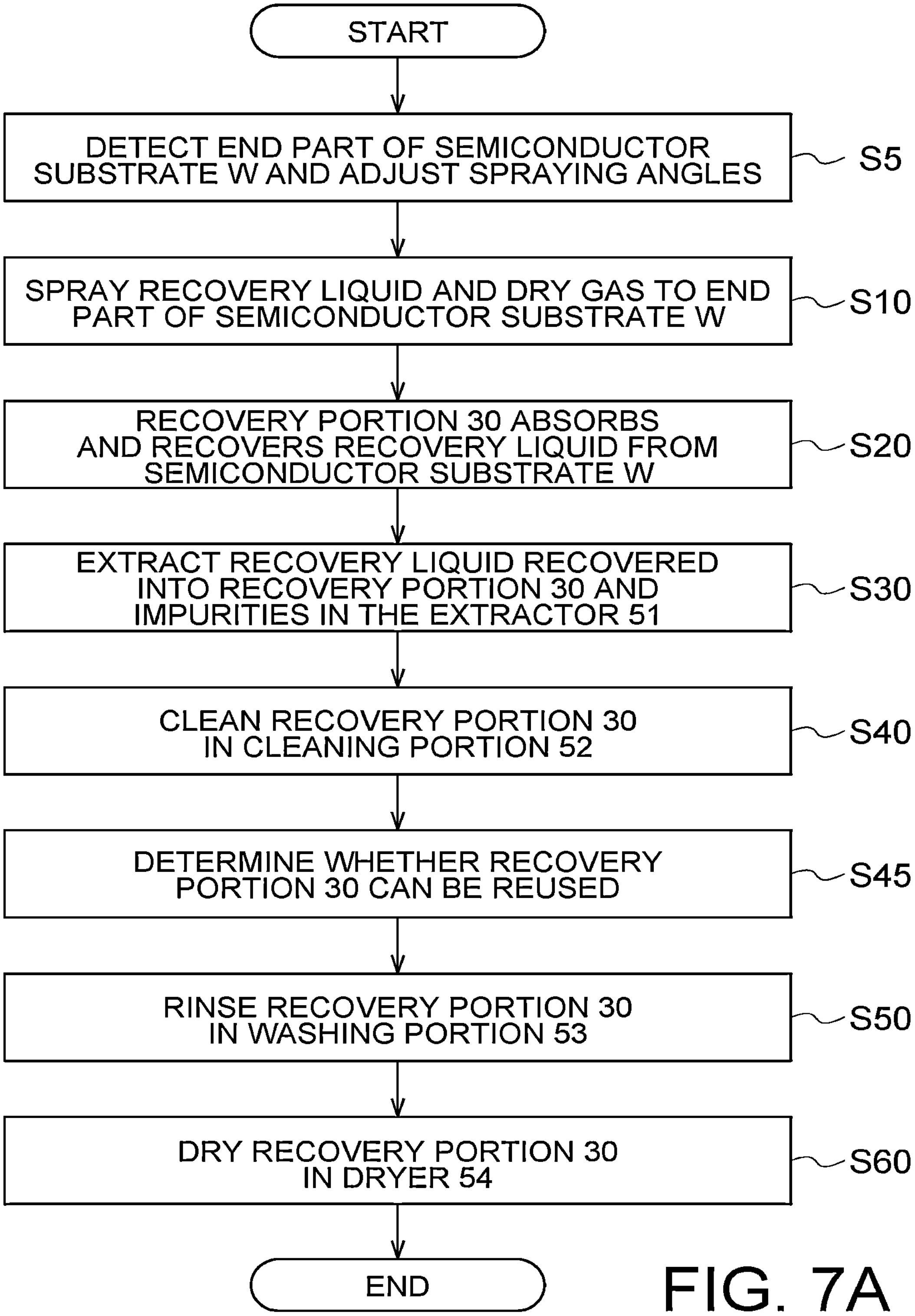
FIG. 7A is a flowchart illustrating an example of the impurity recovery method according to the first embodiment.
Figure 7B:
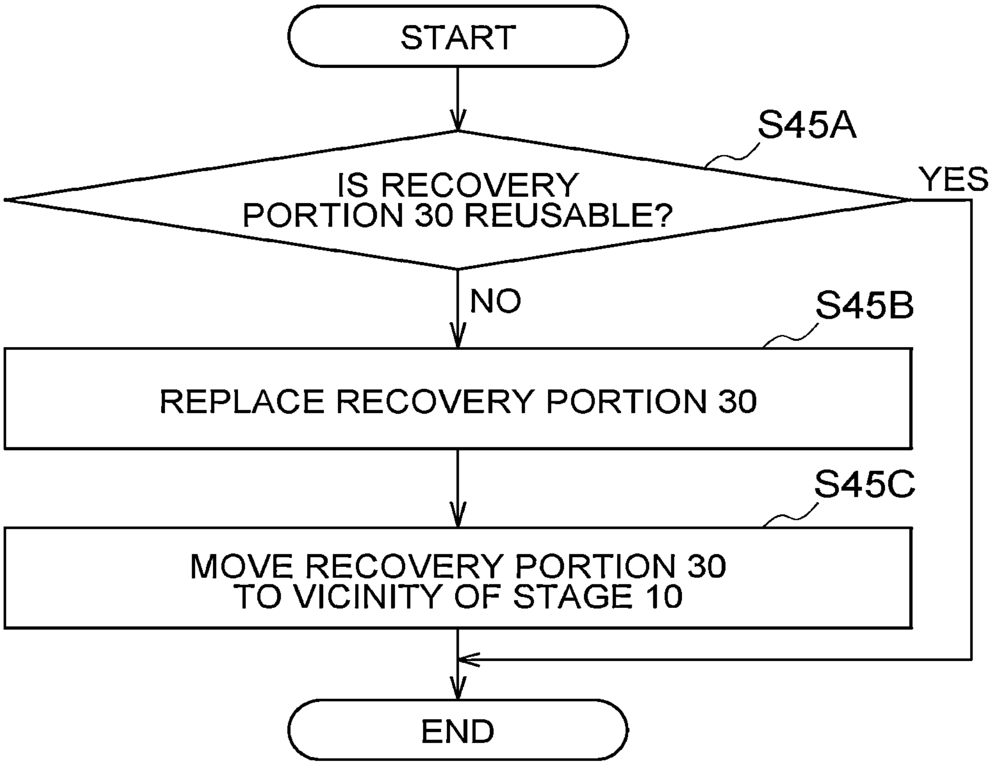
FIG. 7B is a flowchart illustrating an example of the impurity recovery method according to the first embodiment.

FIGS. 5 and 6 are schematic diagrams illustrating an example of an impurity recovery method using the impurity recovery device 1 according to the first embodiment. FIGS. 7A and 7B are flowcharts illustrating an example of the impurity recovery method according to the first embodiment.

First, the semiconductor substrate W is placed on the stage 10. At this time, an image of the semiconductor substrate W may be captured by the camera 80, and the controller 70 may perform image processing and detect the end part of the semiconductor substrate W. More specifically, the controller 70 may detect the angles of inclination θFS and θRS of the end part of the semiconductor substrate W, control the driving portion 60, and adjust the angles of inclination ea and θb of the sprayers 20*a* and 20*b* in accordance with the detected angles of inclination θFS and θRS of the end part of the semiconductor substrate W (S5).

The impurity recovery device 1 sprays a recovery liquid and dry gas from the sprayers 20*a* and 20*b* to the end part of the semiconductor substrate W while bringing the recovery portion 30 into contact with the end part of the semiconductor substrate W and rotating the semiconductor substrate W and the recovery portion 30 (S10), as described with reference to FIGS. 1 to 3.

The recovery liquid is blown to the end part of the semiconductor substrate W, and takes in impurities present on the semiconductor substrate W by causing the impurities to be dissolved therein. Thereafter, the recovery liquid flows or flies from the end part of the semiconductor substrate W to the recovery portion 30.

The recovery portion 30 absorbs and recovers the recovery liquid from the semiconductor substrate W (S20). The impurities present on the semiconductor substrate W are contained in the recovery liquid. After the recovery portion 30 absorbs the recovery liquid, the operation of rotating the semiconductor substrate W and the recovery portion 30 is stopped.

Next, as illustrated in FIG. 5, the support portion 40 rotates (pivots) around a support within the X-Y plane to move the recovery portion 30 to above the extractor 51 of the extraction and cleaning portion 50. Further, as illustrated in FIG. 6, a member between the support portion 40 and the recovery portion 30 extends in the Z-direction and inserts the recovery portion 30 into a liquid tank of the extractor 51. The recovery portion 30 is immersed in a recovery liquid not containing impurities in the extractor 51. Accordingly, the recovery liquid recovered into the recovery portion 30 and the impurities contained in that recovery liquid are extracted into the recovery liquid in the extractor 51 (S30).

After the member between the support portion 40 and the recovery portion 30 is shortened, the support portion 40 rotates (pivots) around the support within the X-Y plane in a similar manner to move the recovery portion 30 to above the cleaning portion 52. Further, the member between the support portion 40 and the recovery portion 30 extends and inserts the recovery portion 30 into a liquid tank of the cleaning portion 52. The recovery portion 30 is immersed in a cleaning solution in the cleaning portion 52. The recovery portion 30 is thereby cleaned with the cleaning solution in the cleaning portion 52 (S40). The recovery portion 30 may be immersed in the cleaning solution once or multiple times. When the recovery portion 30 is immersed multiple times, the cleaning solution may be changed in every immersion, for example.

Thereafter, a process of determining whether the recovery portion 30 can be reused is further performed (S45). More specifically, as illustrated in FIG. 7B, it is determined whether the recovery portion 30 is reusable, for example (S45A). When the recovery portion 30 has been determined as being reusable (YES at S45A), the recovery portion 30 is returned to the vicinity of the stage 10, i.e., the position illustrated in FIG. 1 by the support portion 40 (S45C). Meanwhile, when the recovery portion 30 has been determined as not being reusable (NO at S45A), the recovery portion 30 is detached from the support portion 40, a new recovery portion is attached (S45B), and thereafter the new recovery portion is moved to the vicinity of the stage 10 by the support portion 40 (S45C). The determination whether the recovery portion 30 is reusable (S45A) may be made by performing quantitative analysis of impurities by ICP-MS or the like using the cleaning solution after the recovery portion 30 has been immersed in the cleaning portion 52, for example.

After the member between the support portion 40 and the recovery portion 30 is shortened, the support portion 40 rotates (pivots) around the support within the X-Y plane in a similar manner to move the recovery portion 30 to above the washing portion 53. Further, the member between the support portion 40 and the recovery portion 30 extends and inserts the recovery portion 30 into a liquid tank of the washing portion 53. The recovery portion 30 is immersed in pure water in the washing portion 53. In this manner, the recovery portion 30 is rinsed with the pure water in the washing portion 53 (S50).

After the member between the support portion 40 and the recovery portion 30 is shortened, the support portion 40 rotates (pivots) around the support within the X-Y plane in a similar manner to move the recovery portion 30 to above the dryer 54. Further, the member between the support portion 40 and the recovery portion 30 extends and inserts the recovery portion 30 into a tank of the dryer 54. The recovery portion 30 is exposed to dry gas (for example, nitrogen gas) in the dryer 54. The recovery portion 30 is thereby dried (S60).

In a case of recovering impurities on another semiconductor substrate, the semiconductor substrate W is carried out from the stage 10, and the other semiconductor substrate is placed on the stage 10. Thereafter, the support portion 40 returns the recovery portion 30 to the position illustrated in FIG. 1. Accordingly, the recovery portion 30 can be reused for recovering impurities at Steps S5 to S60.

Figure 8:
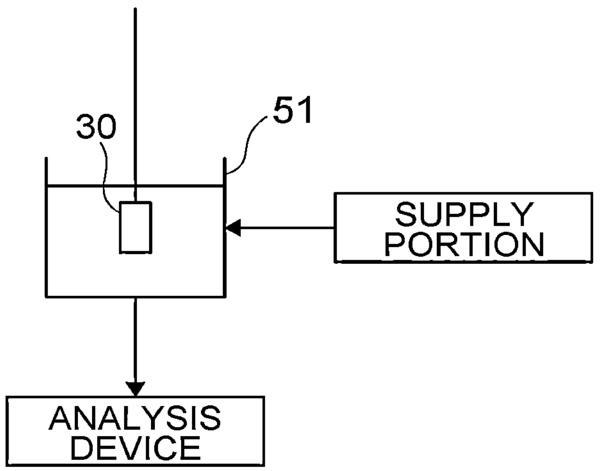
FIG. 8 is a diagram illustrating a state where the recovery portion has been inserted into an extractor.

FIG. 8 is a diagram illustrating a state where the recovery portion 30 has been inserted into the extractor 51. The extractor 51 contains a predetermined amount of recovery liquid from a supply portion. The extractor 51 immerses the recovery portion 30 in the recovery liquid and then sends the recovery liquid to a quantitative analysis device. The quantitative analysis device analyzes the elemental species of impurities contained in the predetermined amount of recovery liquid and the concentration thereof.

Figure 9A:
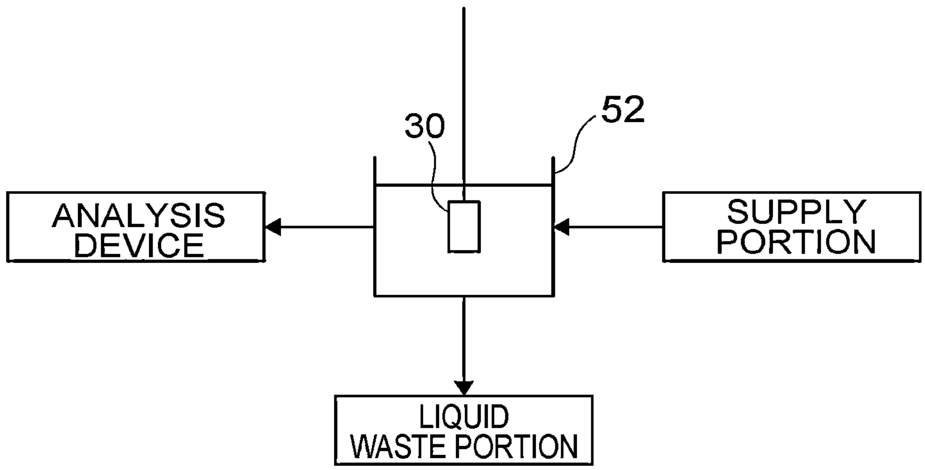
FIG. 9A is a diagram illustrating a state where the recovery portion has been inserted into a cleaning portion.

FIG. 9A is a diagram illustrating a state where the recovery portion 30 has been inserted into the cleaning portion 52. The cleaning portion 52 receives supply of a cleaning solution from a supply portion and cleans the recovery portion 30 with the cleaning solution. The cleaning solution is used for cleaning the recovery portion 30, and thereafter is sent to the quantitative analysis device or discharged to a liquid waste portion. The recovery portion 30 may be immersed in the cleaning solution once or multiple times. When the recovery portion 30 is immersed multiple times, the cleaning solution may be changed in every immersion, for example.

In a case where the cleaning solution is sent to the quantitative analysis device, for example, as illustrated at S45A in FIG. 7B, the cleaning solution is used for determining whether the recovery portion 30 is in a reusable state. In a case of immersing the recovery portion 30 in the cleaning solution multiple times, the cleaning solution used in final immersion of the recovery portion 30, for example, is sent to the quantitative analysis device. For example, as a result of analysis of the cleaning solution by the quantitative analysis device, when the concentration of the impurities contained in a predetermined amount of cleaning solution is equal to or lower than the minimum limit of quantitation, the recovery portion 30 may be determined as being reusable. That is, when the concentration of the impurities contained in the cleaning solution is equal to or lower than the limit of detection by the quantitative analysis device, the recovery portion 30 may be determined as being reusable.

Figure 9B:
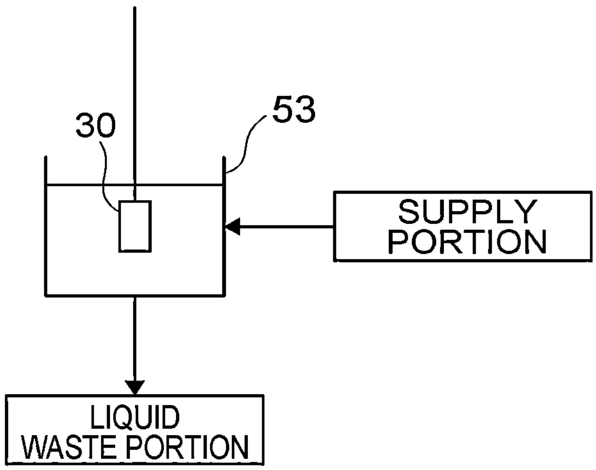
FIG. 9B is a diagram illustrating a state where the recovery portion has been inserted into a washing portion.

FIG. 9B is a diagram illustrating a state where the recovery portion 30 has been inserted into the washing portion 53. The washing portion 53 receives supply of pure water from a supply portion and rinses the recovery portion 30 with the pure water. The pure water is used for rinsing the recovery portion 30, and thereafter is discharged to a liquid waste portion.

Figure 10:
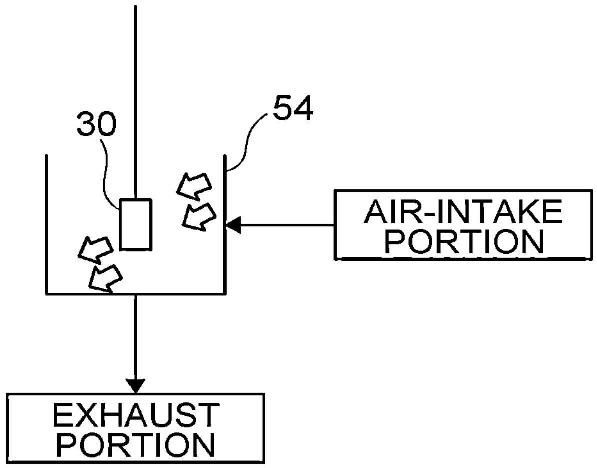
FIG. 10 is a diagram illustrating a state where the recovery portion has been inserted into a dryer.

FIG. 10 is a diagram illustrating a state where the recovery portion 30 has been inserted into the dryer 54. The dryer 54 receives supply of dry gas (e.g. Nitrogen gas) from an air-intake portion and dries the recovery portion 30 with the dry gas. The gas used for drying is exhausted to an exhaust portion from the dryer 54.

As described above, the impurity recovery device 1 according to the present embodiment includes the sprayers 20*a* and 20*b* and spray a recovery liquid toward the end part of the semiconductor substrate W. The recovery liquid can be recovered from the end part of the semiconductor substrate W into the recovery portion 30 regardless of whether the semiconductor substrate W is hydrophobic or hydrophilic.

That is, even if the semiconductor substrate W is hydrophilic, it is unnecessary to wipe the recovery liquid manually, and the recovery portion 30 can recover the recovery liquid and the impurities automatically. Due to automatic recovery of the recovery liquid and the impurities, the accuracy of quantitative analysis of the impurities, such as ICP-MS, performed thereafter is improved.

Further, the recovery portion 30 moves along the rotation axis A30 (in the Z-direction) while rotating about the rotation axis A30 and rolling on the outer circumference of the semiconductor substrate W. Thus, a portion of contact between the semiconductor substrate W and the recovery portion 30 moves spirally in the side surface of the recovery portion 30. As a result, the recovery liquid and the impurities can be absorbed by the entire side surface of the recovery portion 30. Accordingly, it is possible to prevent only a part of the recovery portion 30 from coming into contact with the semiconductor substrate W and being deteriorated. Further, a portion of the side surface of the recovery portion 30, which has not absorbed the recovery liquid and the impurities, can come into contact with the semiconductor substrate W, and therefore the recovery liquid and the impurities that have been absorbed in the recovery portion 30 once can be prevented from adhering to the semiconductor substrate W again.

Second Embodiment

Figure 11:
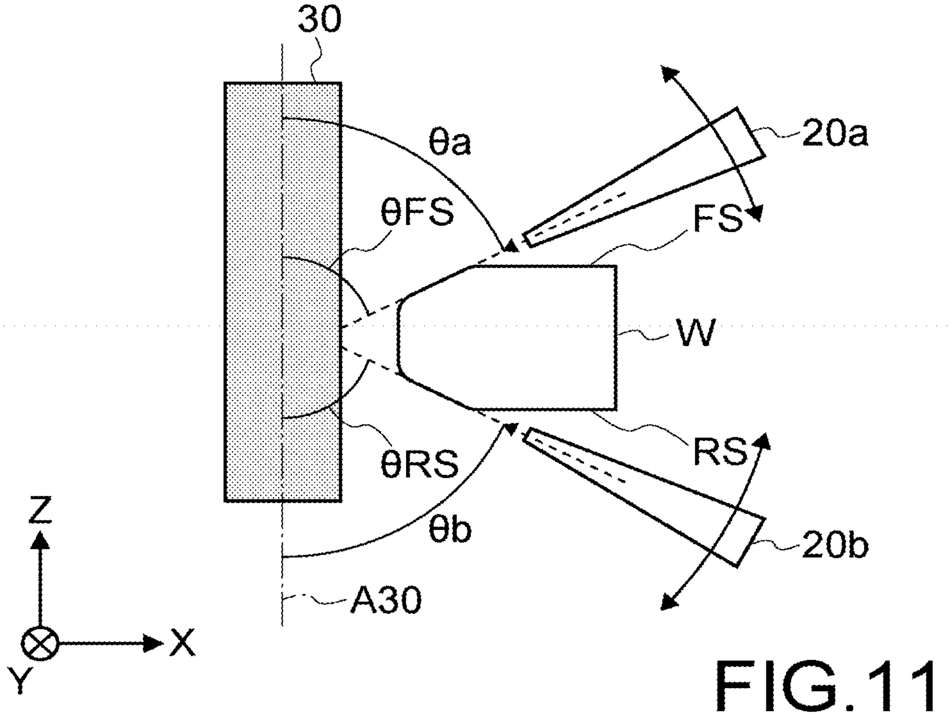
FIG. 11 is a diagram illustrating a configuration example of a recovery portion and sprayers according to a second embodiment.
Figure 12:
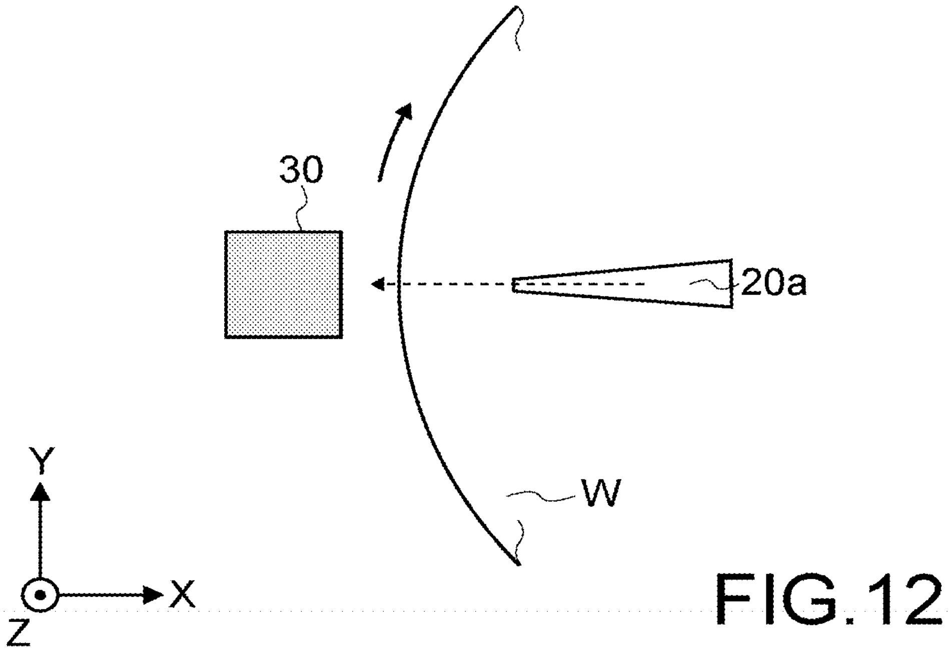
FIG. 12 is a diagram illustrating a configuration example of the recovery portion and the sprayers according to the second embodiment.

FIGS. 11 and 12 are diagrams illustrating a configuration example of the recovery portion 30 and the sprayers 20*a* and 20*b* according to a second embodiment. In the second embodiment, the recovery portion 30 is apart from the semiconductor substrate W when recovering a recovery liquid. Therefore, the recovery portion 30 does not have to rotate about the rotation axis A30 (rotate about its own axis) while rolling on the outer circumference of the semiconductor substrate W. In this case, as illustrated in FIG. 12, the recovery portion 30 does not have to be approximately cylindrical or columnar, and may have a shape of an approximately square tube or an approximately prism. As described above, the recovery portion 30 is located at a fixed position with respect to the sprayers 20*a* and 20*b*, and does not rotate about the rotation axis A30 (rotate about its own axis) with respect to rotation in the circumferential direction of the semiconductor substrate W.

Other configurations and operations of the second embodiment may be identical to those of the first embodiment. Even with the configurations of the second embodiment, effects identical to those of the first embodiment can be achieved. That is, since the recovery portion 30 is apart from the semiconductor substrate W, it is possible to prevent only a part of the recovery portion 30 from coming into contact with the semiconductor substrate W and being deteriorated, and prevent the recovery liquid and the impurities that have been absorbed in the recovery portion 30 once from adhering to the semiconductor substrate W again.

In the second embodiment, the recovery portion 30 may move in the Z-direction during an impurity recovery process. In this case, the recovery portion 30 can absorb the recovery liquid evenly in the Z-direction. Further, the recovery portion 30 may rotate about the rotation axis A30 (the Z-axis) (rotate about its own axis), as with the recovery portion 30 in the first embodiment. The recovery portion 30 can thereby absorb the recovery liquid evenly in a rotational direction.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An impurity recovery device for recovering impurities present on a surface of a substrate, comprising:

- a stage on which the substrate is placed;
- a sprayer configured to spray a recovery liquid toward the substrate along a direction from a central part of the substrate to a bevel part of the substrate; and
- a recovery portion configured to recover the recovery liquid from the bevel part of the substrate, and the recovery portion formed by a porous material or a fiber material.

2. The device of claim 1, wherein the sprayer sprays the recovery liquid and dry gas mixed together to the substrate.

3. The device of claim 2, wherein an outlet of the sprayer sprays the recovery liquid and the dry gas in a direction of inclination that is substantially the same as a direction of inclination of the bevel part of the substrate.

4. The device of claim 1, wherein the recovery liquid is any of hydrochloric acid (HCl), hydrofluoric acid (HF), nitric acid ($HNO_3$), and hydrogen peroxide solution ($H_2O_2$).

5. The device of claim 1, wherein the recovery portion is apart from the substrate when recovering the recovery liquid.

6. The device of claim 5, wherein the recovery portion is arranged at a fixed position with respect to the sprayer and does not rotate even when the substrate rotates in a circumferential direction.

7. The device of claim 1, wherein the recovery portion rotates to follow rotation in the circumferential direction of the substrate while being in contact with the bevel part of the substrate, when recovering the recovery liquid.

8. The device of claim 7, wherein the recovery portion moves along a direction of a rotation axis of the recovery portion while rotating to follow the rotation in the circumferential direction of the substrate.

9. The device of claim 1, further comprising:

- an extractor configured to accommodate the recovery liquid and extract the impurities contained in the recovery portion into the recovery liquid by allowing the recovery portion to be inserted thereinto;
- a cleaning portion configured to accommodate a cleaning solution and clean the recovery portion by allowing the recovery portion to be inserted thereinto;
- a dryer configured to blow gas to the recovery portion inserted thereinto to dry the recovery portion; and
- a motor configured to move and insert the recovery portion into the extractor, the cleaning portion, and the dryer in that order.

* * * * *